(12) United States Patent
McCarthy et al.

(10) Patent No.: US 6,478,848 B1
(45) Date of Patent: Nov. 12, 2002

(54) DIRECT SMELTING PROCESS

(75) Inventors: Carolyn Anne McCarthy, Palmyla (AU); Rodney James Dry, City Beach (AU); Tara Ellen Goldsworthy, South Perth (AU)

(73) Assignee: Technological Resources Pty Ltd, Melbourne (AU)

( * ) Notice: Subject to any disclaimer, the term of this patent is extended or adjusted under 35 U.S.C. 154(b) by 0 days.

(21) Appl. No.: 09/509,286

(22) PCT Filed: Sep. 3, 1999

(86) PCT No.: PCT/AU99/00725

§ 371 (c)(1), (2), (4) Date: Mar. 21, 2000

(87) PCT Pub. No.: WO00/14285

PCT Pub. Date: Mar. 16, 2000

(30) Foreign Application Priority Data

Sep. 4, 1998 (AU) .............................................. PP5700

(51) Int. Cl.⁷ .............................................. C21B 11/00
(52) U.S. Cl. .............................. 75/414; 75/501; 75/502; 266/225
(58) Field of Search ......................... 75/501, 414, 502; 266/225

(56) References Cited

U.S. PATENT DOCUMENTS

| | | |
|---|---|---|
| 2,647,045 A | 7/1953 | Rummel |
| 3,463,472 A | 8/1969 | Worner |
| 3,844,770 A | 10/1974 | Nixon |
| 3,845,190 A | 10/1974 | Yosim et al. |
| 3,888,194 A | 6/1975 | Kishigami et al. |
| 3,890,908 A | 6/1975 | von Klenck et al. |
| 3,894,497 A | 7/1975 | Helke et al. |
| 4,007,034 A | 2/1977 | Hartwig et al. |

FOREIGN PATENT DOCUMENTS

| | | |
|---|---|---|
| AU | A-23864/84 | 1/1984 |
| AU | B-41064/85 | 4/1986 |

(List continued on next page.)

OTHER PUBLICATIONS

Patent Abstract of Japan, JP, A, 10–280020 (Nippon Steel Corp.), Oct. 20, 1998.
Patent Abstracts of Japan, C–951, p. 24, JP, A, 04–63218 (Kawasaki Heavy Ind. Ltd), Feb. 28, 1992.
Patent Abstracts of Japan, C–627, p. 109, Jp, A, 01–127613 (Kawasaki Steel Corp.), May 19, 1989.
WPAT Print–out for Brazilian patent application PI9400123–5 (Weber), 1995.
Patent Abstracts of Japan, C–951, JP, A, 4–63217 (Kawasaki Heavy Ind. Ltd.), Feb. 28, 1992.
Patent abstracts of Japan, C–497, p. 115, JP, A, 62–280315 (Nippon Kokan K.K), Dec. 15, 1987.
Derwent Abstract Accession No. 87–039748/06 Class Q77, JP, A, 61–295334, Dec. 26, 1986.

*Primary Examiner*—Melvyn Andrews
(74) *Attorney, Agent, or Firm*—Merchant & Gould, P.C.

(57) ABSTRACT

A direct smelting process for producing metal from a metalliferous feed material is disclosed. The direct smelting process is a molten bath-based process in which smelting occurs predominantly in the metal layer, carrier gas/metalliferous feed material/solid carbonaceous material are injected into the metal layer via lances/tuyeres, and oxygen-containing gas is injected into the top space above the molten bath and post-combusts reaction gases released from the bath. The injection of metalliferous feed material and solid carbonaceous material causes molten material to be projected from the molten bath as splashes, droplets and streams and to form a transition zone. The process is characterized by forming a pipe of a solid material on an outlet end of at least one lance/tuyere while injecting the metalliferous feed material and the carbonaceous material through the lances/tuyeres and thereby extending the effective length of the lance/tuyere or the lances/tuyeres.

13 Claims, 2 Drawing Sheets

U.S. PATENT DOCUMENTS

| | | | |
|---|---|---|---|
| 4,053,301 A | 10/1977 | Stephens, Jr. | |
| 4,145,396 A | 3/1979 | Grantham | |
| 4,177,063 A | 12/1979 | Dickson | |
| 4,207,060 A | 6/1980 | Zangs | |
| 4,356,035 A | 10/1982 | Brotzmann et al. | |
| 4,389,043 A | 6/1983 | Weber et al. | |
| 4,400,936 A | 8/1983 | Evans | |
| 4,402,274 A | 9/1983 | Meenan et al. | |
| 4,431,612 A | 2/1984 | Bell et al. | |
| 4,447,262 A | 5/1984 | Gay et al. | |
| 4,455,017 A | 6/1984 | Wunsche | |
| 4,468,298 A | 8/1984 | Byrne et al. | |
| 4,468,299 A | 8/1984 | Byrne et al. | |
| 4,468,300 A | 8/1984 | Byrne et al. | |
| 4,504,043 A | 3/1985 | Yamaoka et al. | |
| 4,511,396 A | 4/1985 | Nixon | |
| 4,565,574 A | 1/1986 | Katayama et al. | |
| 4,566,904 A | 1/1986 | von Bogdandy et al. | |
| 4,572,482 A | 2/1986 | Bedell | |
| 4,574,714 A | 3/1986 | Bach et al. | |
| 4,602,574 A | 7/1986 | Bach et al. | |
| 4,664,618 A | 5/1987 | Gitman | |
| 4,681,599 A | 7/1987 | Obkircher | |
| 4,684,448 A | 8/1987 | Itoh et al. | |
| 4,701,214 A | 10/1987 | Kaneko et al. | |
| 4,718,643 A | 1/1988 | Gitman | |
| 4,786,321 A | 11/1988 | Hoster et al. | |
| 4,790,516 A | 12/1988 | Sugiura et al. | |
| 4,798,624 A | 1/1989 | Brotzmann et al. | |
| 4,849,015 A | 7/1989 | Fassbinder et al. | |
| 4,861,368 A | 8/1989 | Brotzmann et al. | |
| 4,874,427 A | 10/1989 | Hamada et al. | |
| 4,890,562 A | 1/1990 | Gitman | |
| 4,913,734 A | 4/1990 | Romenets et al. | |
| 4,923,391 A | 5/1990 | Gitman | |
| 4,940,488 A | 7/1990 | Maeda et al. | |
| 4,946,498 A | 8/1990 | Weber | |
| RE33,464 E | 11/1990 | Gitman | |
| 4,976,776 A | 12/1990 | Elvander et al. | |
| 4,999,097 A | 3/1991 | Sadoway | |
| 5,005,493 A | 4/1991 | Gitman | |
| 5,024,737 A | 6/1991 | Claus et al. | |
| 5,037,608 A | 8/1991 | Tarcy et al. | |
| 5,042,964 A | 8/1991 | Gitman | |
| 5,050,848 A | 9/1991 | Hardie et al. | |
| 5,051,127 A | 9/1991 | Hardie et al. | |
| 5,065,985 A | 11/1991 | Takahashi et al. | |
| 5,177,304 A | 1/1993 | Nagel | |
| 5,191,154 A | 3/1993 | Nagel | |
| 5,222,448 A | 6/1993 | Morgenthaler et al. | |
| 5,238,646 A | 8/1993 | Tarcy et al. | |
| 5,251,879 A | * 10/1993 | Floyd | 266/225 |
| 5,271,341 A | 12/1993 | Wagner | |
| 5,279,715 A | 1/1994 | La Camera et al. | |
| 5,301,620 A | 4/1994 | Nagel et al. | |
| 5,302,184 A | 4/1994 | Batterham et al. | |
| 5,322,547 A | 6/1994 | Nagel et al. | |
| 5,332,199 A | 7/1994 | Knapp et al. | |
| 5,333,558 A | 8/1994 | Lees, Jr. | |
| 5,350,158 A | * 9/1994 | Whellock | 266/225 |
| 5,396,850 A | 3/1995 | Conochie et al. | |
| 5,401,295 A | 3/1995 | Brotzmann | |
| 5,407,461 A | 4/1995 | Hardie et al. | |
| 5,415,742 A | 5/1995 | La Camera et al. | |
| 5,443,572 A | 8/1995 | Wilkison et al. | |
| 5,480,473 A | 1/1996 | Hardie et al. | |
| 5,489,325 A | 2/1996 | Keogh et al. | |
| 5,498,277 A | 3/1996 | Floyd et al. | |
| 5,518,523 A | 5/1996 | Brotzmann | |
| 5,529,599 A | 6/1996 | Calderon | |
| 5,640,708 A | 6/1997 | Conochie et al. | |
| 5,647,888 A | 7/1997 | Keogh et al. | |
| 5,741,349 A | 4/1998 | Hubble et al. | |
| 5,800,592 A | 9/1998 | den Hartog et al. | |
| 5,802,097 A | 9/1998 | Gensini et al. | |
| 5,891,214 A | * 4/1999 | Innes et al. | 75/501 |
| 5,938,815 A | 8/1999 | Satchell, Jr. | |

FOREIGN PATENT DOCUMENTS

| | | |
|---|---|---|
| AU | B-69707/87 | 9/1987 |
| AU | B-22448/88 | 5/1989 |
| AU | B-26831/88 | 7/1989 |
| AU | B-28802/89 | 8/1989 |
| AU | A-42859/89 | 4/1990 |
| AU | A-49307/90 | 9/1990 |
| AU | A-49309.90 | 9/1990 |
| AU | B-74840/91 | 10/1991 |
| AU | B-90957/91 | 8/1992 |
| AU | A-48938/93 | 4/1994 |
| AU | B-48937/93 | 5/1994 |
| AU | B-50820/96 | 1/1997 |
| DE | 3139375 | 4/1983 |
| DE | 3244744 | 5/1984 |
| EP | 079 182 A1 | 5/1983 |
| EP | 084 288 A1 | 7/1983 |
| EP | 0 326 402 | 8/1989 |
| EP | 422 309 A1 | 4/1991 |
| EP | 541 269 A1 | 5/1993 |
| EP | 592 830 A1 | 4/1994 |
| GB | 2 043 696 A | 10/1980 |
| GB | 2 088 892 A | 6/1982 |
| WO | WO 92/12265 | 7/1992 |
| WO | WO 93/06251 | 4/1993 |
| WO | WO 94/19497 | 9/1994 |
| WO | WO 96/19591 | 6/1996 |
| WO | WO 96/31627 | 10/1996 |
| WO | WO 97/17473 | 5/1997 |
| WO | WO 97/20958 | 6/1997 |
| WO | WO 97/23656 | 7/1997 |
| WO | WO 97/27338 | 7/1997 |
| WO | WO 97/35038 | 9/1997 |
| WO | WO 98/27232 | 6/1998 |
| WO | WO 98/27239 | 6/1998 |
| WO | WO 99/16911 | 4/1999 |
| WO | WO 00-01854 | 1/2000 |

* cited by examiner

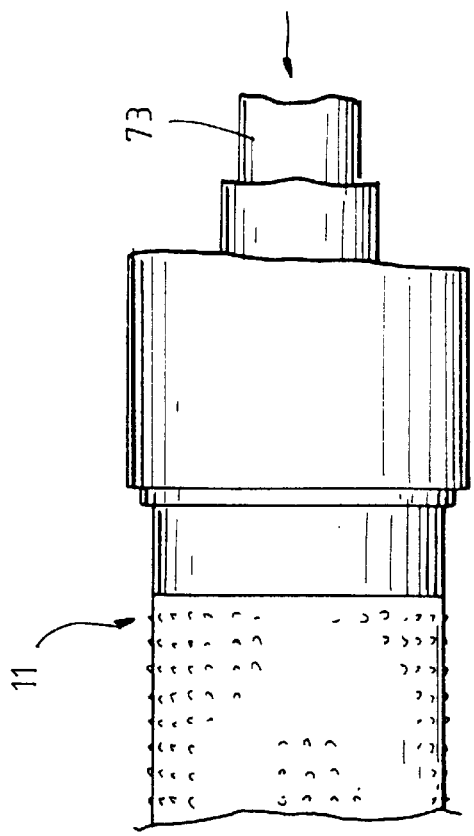
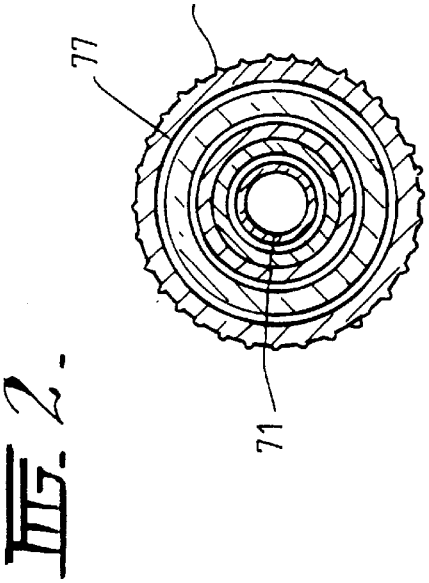
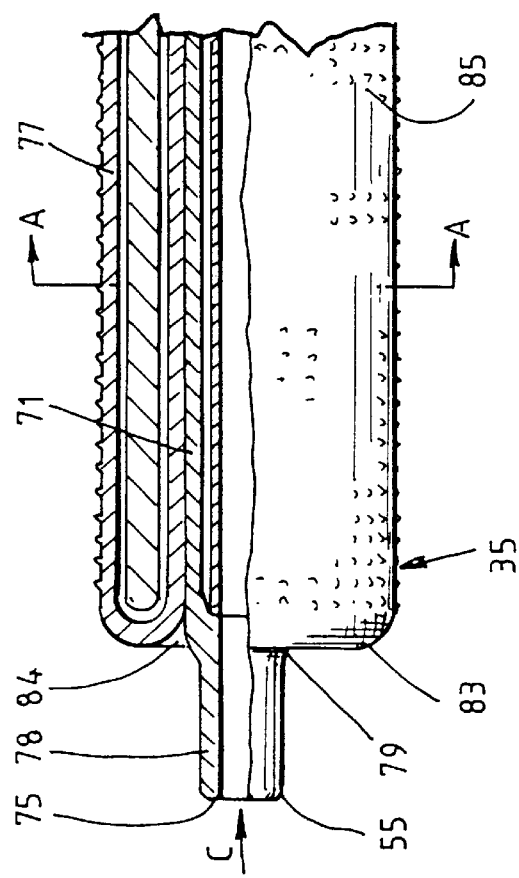
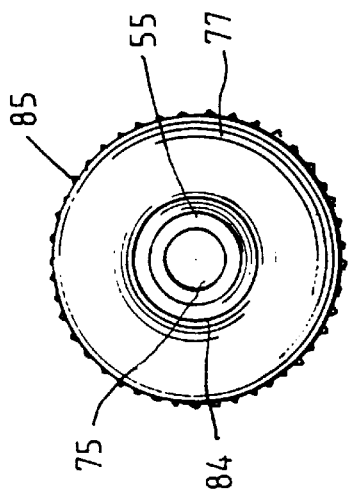

DIRECT SMELTING PROCESS

The present invention relates to a process for producing metals (which term includes metal alloys), in particular although by no means exclusively iron, from a metalliferous feed material, such as ores, partly reduced ores and metal-containing waste streams, in a metallurgical vessel containing a molten bath.

The present invention relates particularly to a molten metal bath-based direct smelting process for producing molten metal from a metallurgical feed material.

A known direct smelting process, which relies on a molten metal layer as a reaction medium, and is generally referred to as the HIsmelt process, is described in International application PCT/AU96/00197 (WO 96/31627) in the name of the applicant.

The HIsmelt process as described in the International application comprises:
(a) forming a bath of molten iron and slag in a vessel;
(b) injecting into the bath:
  (i) a metalliferous feed material, typically metal oxides; and
  (ii) a solid carbonaceous material, typically coal, which acts as a reductant of the metal oxides and a source of energy; and
(c) smelting metalliferous feed material to metal in the metal layer.

The term "smelting" is herein understood to mean thermal processing wherein chemical reactions that reduce metal oxides take place to produce liquid metal.

The HIsmelt process also comprises post-combusting reaction gases, such as CO and $H_2$, released from the bath in the space above the bath with oxygen-containing gas and transferring the heat generated by the post-combustion to the bath to contribute to the thermal energy required to smelt the metalliferous feed materials.

The HIsmelt process also comprises forming a transition zone above the nominal quiescent surface of the bath in which there is a favourable mass of ascending and thereafter descending droplets or splashes or streams of molten metal and/or slag which provide an effective medium to transfer to the bath the thermal energy generated by post-combusting reaction gases above the bath.

The applicant has carried out extensive pilot plant work on the HIsmelt process and has made a series of significant findings in relation to the process.

One significant finding is that it is possible to achieve a surprisingly high degree of control over the process by:
(a) injecting solid materials, such as metalliferous feed material and solid carbonaceous material, into the metal layer via a plurality of lances/tuyeres positioned above and extending towards the metal layer; and
(b) forming a pipe of a solid material, which typically is at least predominantly slag, on the ends of each lance/tuyere and thereby extending the lengths of the lances/tuyeres.

The control is the result of the lengths of the pipes automatically varying with the level of the molten metal and thereby maintaining a substantially constant spacing between the effective ends of the lances/tuyeres and the metal.

The length of a pipe on a lance/tuyere is determined by the level of molten metal in the molten bath in the vicinity of the lance/tuyere. Specifically, as the molten metal level increases there is a greater likelihood that molten metal that splashes or is otherwise projected from the metal layer will contact and melt the end of a pipe due to the higher heat transfer of metal compared with slag. In addition, as the molten metal level decreases there is less likelihood of contact of molten metal and the pipe and therefore the end of the pipe can progressively increase towards the metal layer. Variations in the molten metal level occur in continuous and batch metal tapping processes and thus the invention is relevant to both types of processes.

In addition to providing a high degree of control over injection of solid materials into the metal layer—which is important in a metal-based direct smelting process such as the HIsmelt process—the present invention makes it possible to operate with fixed solid material injection lances/tuyeres. This is an advantage because movable lances/tuyeres require seals and seals tend to be difficult to design for no leakage or failure.

In addition to the above advantages, the present invention makes it possible to position a lance/tuyere well clear of the splash zone of the molten metal and thereby avoid damage to the lance/tuyere by contact with molten metal, while ensuring that the effective end of the lance/tuyere is as close as possible to the metal layer. This makes it possible to use a water-cooled lance/tuyere without having the lance/tuyere too close to the molten metal to be a serious safety risk. This is a particularly important issue in a molten layer-based smelting process, such as the HIsmelt process. Thus, the present invention makes it possible to reconcile the conflicting requirements of (i) safety, which dictates positioning the lances/tuyeres as far aware as possible from the metal layer and (ii) performance, which dictates positioning the lances/tuyeres close to the metal layer to optimise injection of reactants into the metal layer.

According to the present invention there is provided a direct smelting process for producing metal from a metalliferous feed material which includes the steps of:
(a) forming a molten bath having a metal layer and a slag layer on the metal layer in a metallurgical vessel;
(b) injecting a carrier gas, a metalliferous feed material, and a solid carbonaceous material into the metal layer via a plurality of solid material injection lances/tuyeres positioned above and extending towards the surface of the metal layer and causing molten material to be projected from the molten bath as splashes, droplets and streams into a space above a nominal quiescent surface of the molten bath to form a transition zone;
(c) smelting metalliferous feed material to metal in the metal layer;
(d) injecting an oxygen-containing gas into the vessel via one or more than one lance/tuyere and post-combusting reaction gases released from the molten bath, whereby the ascending and thereafter descending splashes, droplets and streams of molten material in the transition zone facilitate heat transfer to the molten bath, and whereby the transition zone minimises heat loss from the vessel via the side walls in contact with the transition zone; and
the process being characterised by forming a pipe of a solid material on the end of at least one lance/tuyere while injecting the metalliferous feed material and the carbonaceous material through the solid material injection lances/tuyeres and thereby extending the effective length of the lance/tuyere or the lances/tuyeres.

Typically, molten metal is a major part and slag is the remaining part of the molten material in the splashes, droplets, and streams of molten material from the metal layer. Typically, the splashes, droplets, and streams of molten material entrain further molten material (particularly slag) as they move upwardly. In addition, increasingly, the splashes, droplets, and streams of molten material lose momentum and fall downwardly towards the metal layer. In view of the higher density of metal than slag the relative amount of metal in the molten material in the splashes, droplets, and streams decreases with distance from the metal layer to the point where the transition zone may include small amounts, if any, metal.

The term "metal layer" is understood herein to mean that region of the bath that is predominantly metal. Specifically, the term covers a region or zone that includes a dispersion of molten slag in a metal continuous volume.

The term "slag layer" is understood herein to mean that region of the bath that is predominantly slag. Specifically, the term covers a region or zone that includes a dispersion of molten metal in a slag continuous volume.

The space above the nominal quiescent surface of the bath is hereinafter referred to as the "top space".

The term "quiescent surface" in the context of the molten bath is understood to mean the surface of the molten bath under process conditions in which there is no gas/solids injection and therefore no bath agitation.

Similarly, the term "quiescent surface" in the context of the metal layer is understood to mean the surface of the metal layer under process conditions in which there is no gas/solids injection and therefore no bath agitation.

Typically, the pipe or pipes are formed at least predominantly from solidified slag. The or each pipe may include some solidified metal.

Preferably the process includes locating each solid material injection lance/tuyere so that the outlet end is below the surface of the molten bath and above the metal layer.

Preferably the process includes locating each solid material injection lance/tuyere so that the outlet end is at least 150 mm above a quiescent surface of the metal layer.

Preferably the process locating each solid material injection lance/tuyere so that the outlet end is no more than 500 mm, more preferably no more than 400 mm, above a quiescent surface the metal layer.

In the context of the heights of the solid material injection lances/tuyeres above the quiescent surface of the metal layer described in the preceding two paragraphs, depending on parameters such as mass flow rate of solid material through the lances/tuyeres, the applicant found in pilot plant work that the length of the pipe or pipes was up to 600 mm, typically at least 200 mm. It can readily be appreciated that a pipe length of 600 mm, and a lance/tuyere angle of 30–60° to the vertical, inevitably means that the pipe or pipes can extend below the quiescent surface of the metal layer. This is an important finding for a process which smelts at least predominantly in the metal layer because it means that there is significant penetration of solid material in the metal layer.

Preferably step (d) includes forming the pipe or pipes by injecting the metalliferous feed material and the carbonaceous material through the solid material injection lances/tuyeres so that the endothermic nature of these materials creates a region around the ends of the solid material injection lances/tuyeres which is below a temperature at which slag freezes. One important control parameter in this regard is to inject the metalliferous material and the carbonaceous material with an oxygen-deficient gas.

Accordingly, preferably step (b) includes injecting the metalliferous feed material and the carbonaceous material with an oxygen-deficient gas.

Preferably the process includes injecting the metalliferous material and/or the carbonaceous material so that the or each pipe forms as a co-axial extension of the or each solid material injection lance/tuyere. Important control parameters in this regard are the mass flow rate of the metalliferous feed material and the carbonaceous material and the velocity of the stream of the carrier gas, metalliferous feed material and the carrier gas.

Preferably the process includes maintaining the outlet end of each solid material injection lance/tuyere at a temperature below that at which slag freezes so as to encourage initial solidification of solid material on the ends.

More preferably the outlet end of each solid material injection lance/tuyere is water-cooled and the water cooling maintains the end at a temperature below that at which slag freezes.

Preferably the process is as described in International application PCT/AU99/00538 entitled "Direct Smelting Process" in the name of the applicant and the disclosure in that application is incorporated herein by cross-reference.

According to the present invention there is provided a vessel for producing metal from a metalliferous feed material by a direct smelting process, which vessel contains a molten bath having a metal layer and a slag layer on the metal layer, which vessel includes:

(a) a hearth formed of refractory material having a base and sides in contact with the molten metal;

(b) side walls which extend upwardly from the sides of the hearth and are in contact with the slag layer;

(c) one or more than one lance/tuyere extending downwardly into the vessel and injecting an oxygen-containing gas into the vessel;

(d) a plurality of solid material injection lances/tuyeres extending downwardly and inwardly into the vessel and injecting a carrier gas, a metalliferous feed material, and a carbonaceous material into the metal layer, an outlet end of at least one lance/tuyere being positioned above the surface of the metal layer during operation of the direct smelting process in the vessel and having solidified thereon a pipe of a solid material which forms an extension of the outlet end of the lance/tuyere; and (d) a means for discharging molten metal and slag from the vessel.

Preferably the smelt reduction vessel is as described in International application PCT/AU99/00537 entitled "Direct Smelting Vessel" in the name of the applicant and the disclosure in that application is incorporated herein by cross-reference.

Preferably each solid material injection lance/tuyere is located so that the outlet end is below the surface of the molten bath.

Preferably each solid material injection lance/tuyere is located so that the outlet end is at least 150 mm above a quiescent surface of the metal layer.

Preferably each solid material injection lance/tuyere is located so that the outlet end is no more than 500mm, more preferably no more than 400mm, above a quiescent surface of the metal layer.

Preferably the pipe or pipes are at least 200mm, more preferably at least 300mm, at different stages of the process.

Preferably each solid material injection lance/tuyere includes:

(a) a hollow elongate member that defines a central passageway for the feed material and has an inlet end and the outlet end; and (b) an outer water cooling jacket.

Preferably the member extends beyond the water cooling jacket at the outlet end of the lance/tuyere.

Preferably the outer surface of the water cooled jacket includes a dimpled or other surface profile that increases the exposed area of the water cooling jacket.

Preferably the solid material injection lances/tuyeres extend downwardly and inwardly into the vessel at an angle of 30–60° to the vertical.

Preferably the outlet end of each solid material injection lance/tuyere is located in the slag layer.

The present invention is described further by way of example with reference to the accompanying drawings, of which:

FIG. 2 is a cut-away cross-section of a preferred embodiment of the lance/tuyere for injecting solid material;

FIG. 3 is an end view of the lance/tuyere in the direction of the arrow marked C in FIG. 2; and FIG. 4 is a cross section along the line A—A in FIG. 2.

Figure 1:
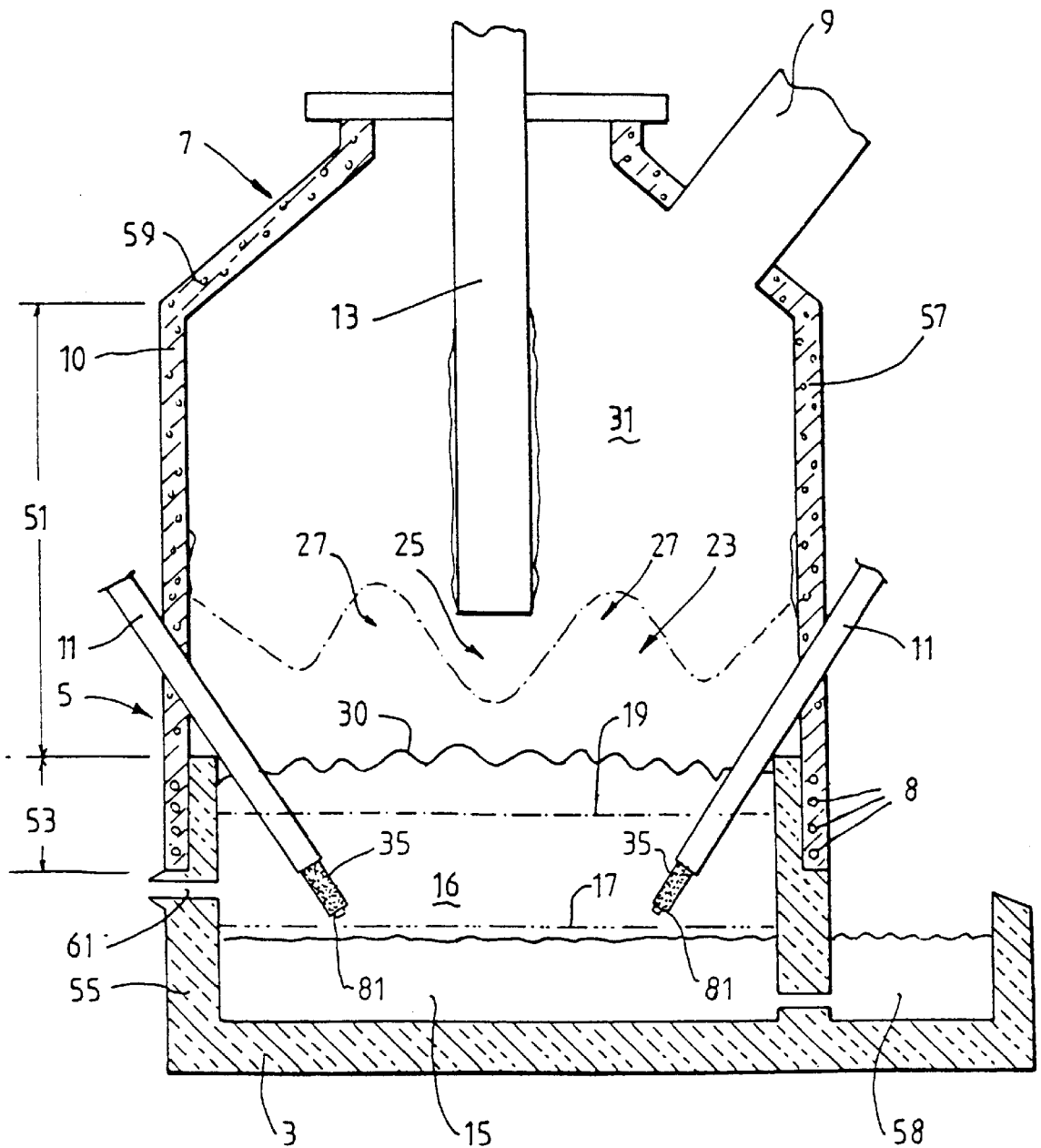
FIG. 1 is a vertical section through a metallurgical vessel illustrating in schematic form a preferred embodiment of the process of the present invention.

The following description is in the context of direct smelting iron ore to produce molten iron and it is understood that the present invention is not limited to this application and is applicable to any suitable metallic ores and/or concentrates and other metalliferous feed material—including partially reduced metallic ores and metal-containing waste materials—which may be pre-heated.

The vessel shown in the figure has a hearth that includes a base 3 and sides 55 formed from refractory bricks; side walls which form a generally cylindrical barrel extending upwardly from the sides of the hearth and which includes an upper barrel section 51 and a lower barrel section 53; a roof 7; an outlet 9 for off-gases; a forehearth 58 for discharging molten metal continuously; and a tap-hole 61 for discharging molten slag.

In use, the vessel contains a molten bath of iron and slag which includes a layer of molten metal and a layer 16 of molten slag on the metal layer 15. The arrow marked by the numeral 17 indicates the position of the nominal quiescent surface of the metal layer and the arrow marked by the numeral 19 indicates the position of the nominal quiescent surface of the slag layer 16. The term "quiescent surface" is understood to mean the surface when there is no injection of gas and solids into the vessel.

The vessel also includes two solids injection lances/tuyeres 11 extending downwardly and inwardly through the side walls and into the slag layer 16 for injecting iron ore, solid carbonaceous material, and fluxes entrained in an oxygen-deficient carrier gas into the metal layer 15. The position of the lances/tuyeres 11 is selected so that the outlet ends are above the surface of the metal layer during operation of the process. This position of the lances/tuyeres 11 reduces the risk of damage to the lances/tuyeres 11 due to contact with molten metal. This position of the lances/tuyeres 11 also makes it possible to water cool the lances/tuyeres 11 which significantly reduces the safety risks associated with the use of water cooling.

In use, the lances/tuyeres 11 are water cooled to an extent sufficient to maintain the ends thereof below the temperature at which slag freezes. This encourages initial solidification of solid material on the end of each lance/tuyere 11 and the solidified material is a base for a pipe 81 of solid material that subsequently forms an extension of each end of the lances/tuyeres 11. The solid material is at least predominantly slag.

The main mechanism for pipe formation is the endothermic nature of injected iron ore and carbonaceous material via the lances/tuyeres 11 which creates a region around the ends of the lances/tuyeres 11 that is below the freezing temperature of the slag. The use of oxygen-deficient carrier gas is important in promoting endothermic reactions.

Furthermore, control of parameters such as the mass flow rate of iron ore and carbonaceous material and the velocity of the carrier gas from the lances/tuyeres 11 ensures that the pipes 81 form as co-axial extensions of the lances/tuyeres 11.

The lengths of the pipes 81 are regulated automatically by the level of molten metal in the metal layer 15. Specifically, as discussed above, as the metal level increases, molten metal that inevitably splashes or is otherwise projected from the metal layer into the slag layer 16 contacts the ends of the pipes 81 and melts the ends (due to the higher heat transfer of metal compared with slag). Moreover, as the metal level decreases, and there is reduced contact of molten metal with the ends of the pipes 81, slag freezes on and thereby extends the ends of the pipes 81.

It is clear from the above that the spacing between the outlet ends of the pipes 81 and molten metal determines the length of the pipe 81. An important outcome of this inter-relationship is that there is a substantially uniform spacing between the injection points of the lances/tuyeres 11 and the metal layer and this assists considerably in controlling the process.

A preferred embodiment of the lance-tuyere 11 is shown in FIGS. 2–4. The lance-tuyere 11 includes a hollow member 71 which defines a central passageway for supplying iron ore, solid carbonaceous material and fluxes entrained in a suitable carrier gas from an inlet 73 to an outlet 75 at the outlet end of the lance-tuyere 11. The lance/tuyere 11 also includes a water cooling jacket 77 which encloses the member 71 for a substantial part of the length of the member 71. The forward end of the member 71 extends beyond the forward end of the jacket 77. This extension 78 of the member 71 has a smaller diameter than that of the remainder of the member 71. The member 71 includes a shoulder 79 which forms a transition between the longer and smaller diameter sections of the member 71. The shoulder 79 is located adjacent the forward end 83 of the water cooling jacket 77 so that the shoulder 79 and the forward end 83 of the jacket 77 define an annular recess, generally identified by the numeral 84. This recess 84 and the extension 78 of the member 71 assist in maintaining a slag pipe on the end of the lance/tuyere 11. The water cooling jacket 77 includes a dimpled surface, generally identified by the numeral 85, which increases the exposed surface area of the jacket 77 and assists in promoting solidification of a slag layer on the jacket 77 which protects the lance/tuyere 11.

In use, under steady state process conditions, iron ore, solid carbonaceous material (typically coal), and fluxes (typically lime and magnesia) entrained in a carrier gas (typically $N_2$) are injected into the metal layer via the lances/tuyeres 11. The momentum of the solid material/carrier gas causes the solid material and gas to penetrate the metal layer 15. The coal is devolatilised and thereby produces gas in the metal layer 15. Carbon partially dissolves into the metal and partially remains as solid carbon. The iron ore is smelted to metal and the smelting reaction generates carbon monoxide gas. The gases transported into the metal layer and generated via devolatilisation and smelting produce significant buoyancy uplift of molten metal, solid carbon, and molten slag (drawn into the metal layer from above the metal layer as a consequence of solid/gas/injection) from the metal layer which generates an upward movement of splashes, droplets and streams of molten material, and these splashes, and droplets, and streams entrain slag as they move through the slag layer 16.

The buoyancy uplift of molten material and solid carbon causes substantial agitation in the metal layer and the slag layer 16, with the result that the slag layer 16 expands in volume and has a surface indicated by the arrow 30. The extent of agitation is such that the metal layer and the slag layer 16 are each substantially homogeneous in that there are reasonably uniform temperatures throughout each region—typically, 1450–1550° C. with a temperature variation of not more than 30° C. in each region—and reasonably uniform compositions throughout each region.

In addition, the upward movement of splashes, droplets and streams of molten metal and slag caused by the buoyancy uplift of molten metal, solid carbon, and slag extends into the top space 31 above the molten material in the vessel and:

(a) forms a transition zone 23; and (b) projects some molten material (predominantly slag) beyond the transition zone and onto the part of the upper barrel section 51 of the side walls that is above the transition zone 23 and onto the roof 7.

In general terms, the slag layer 16 is a liquid continuous volume, with gas bubbles and metal (typically in the form of droplets) therein, and the transition zone 23 is a gas continuous volume with splashes, droplets, and streams of molten material (which is at least predominantly slag at this stage) therein.

The substantial agitation of the metal layer and the slag layer 16 caused by the buoyancy uplift discussed above ensures that there is strong mixing of metal in the slag layer 16. The deliberate injection of solid carbonaceous material into the metal layer ensures that there are high levels of dissolved carbon in the metal that is mixed in the slag layer. As a consequence of the dissolved carbon in metal in the slag layer and the strong mixing of metal in the slag layer, the slag layer has desirably low levels (typically less than 5 wt %) FeO in the slag.

The vessel further includes a lance 13 for injecting an oxygen-containing gas which is centrally located and extends vertically downwardly into the vessel. The position of the lance 13 and the gas flow rate through the lance 13 are selected so that under steady state conditions the oxygen-containing gas penetrates the central region of the transition zone 23 and maintains an essentially metal/slag free space around the end of the lance 13.

In use, under steady state process conditions, the injection of the oxygen-containing gas via the lance 13 post-combusts reaction gases CO and $H_2$ in the transition zone 23 and in the free space around the end of the lance 13 and generates high temperatures of the order of 2000° C. or higher in the gas space. The heat is transferred to the ascending and descending splashes droplets, and streams, of molten material in the region of gas injection and the heat is then partially transferred to the metal layer when the metal/slag returns to the metal layer 15.

Preferably, the level of post-combustion is at least 40%, where post combustion is defined as:

$$\frac{[CO_2] + [H_2O]}{[CO_2] + [H_2O] + [CO] + [H_2]}$$

where:

[$CO_2$]=volume % of $CO_2$ in off-gas;

[$H_2O$]=volume % of $H_2O$ in off-gas;

[CO]=volume % of CO in off-gas; and

[$H_2$]=volume % of $H_2$ in off-gas.

The free space around the end of the lance 13 is important to achieving high levels of post combustion because it enables entrainment of gases in the top space above the transition zone 23 into the end region of the lance 13 and thereby increases exposure of available reaction gases to post combustion.

The combined effect of the position of the lance 13, gas flow rate through the lance 13, and upward movement of splashes, droplets and streams of molten metal and slag is to shape the transition zone 23 around the lower region of the lance 13 —generally identified by the numerals 27. This shaped region provides a partial barrier to heat transfer by radiation to the side walls 5.

Moreover, under steady state process conditions, the ascending and descending droplets, splashes and streams of molten slag is an effective means of transferring heat from the transition zone 23 to the molten bath with the result that the temperature of the transition zone 23 in the region of the side walls is of the order of 1450–1550° C.

The vessel is constructed with reference to the levels of the iron layer 15, the slag layer 16, and the transition zone 23 in the vessel when the process is operating under steady-state process conditions and with reference to splashes, droplets and streams of molten material that are projected into the top space 31 above the transition zone 23 when the process is operating under steady-state operating conditions, so that:

(a) the hearth and the lower barrel section 53 of the side walls 5 that contact the metal/slag layers 15/16 are formed from bricks of refractory material (indicated by the cross-hatching in the figure);

(b) at least part of the lower barrel section 53 of the side walls 5 is backed by water cooled panels 8; and (c) the upper barrel section 51 of the side walls and the roof 7 that contact the transition zone 23 and the top space 31 are formed from water cooled panels 57, 59.

Each water cooled panel 8, 57, 59 (not shown) in the upper barrel section 51 of the side walls has parallel upper and lower edges and parallel side edges and is curved so as to define a section of the cylindrical barrel. Each panel includes an inner water cooling pipe and an outer water cooling pipe. The pipes are formed into a serpentine configuration with horizontal sections interconnected by curved sections. Each pipe further includes a water inlet and a water outlet. The pipes are displaced vertically so that the horizontal sections of the outer pipe are not immediately behind the horizontal sections of the inner pipe when viewed from an exposed face of the panel, ie the face that is exposed to the interior of the vessel. Each panel further includes a rammed refractory material which fills the spaces between the adjacent straight sections of each pipe and between the pipes. Each panel further includes a support plate which forms an outer surface of the panel.

The water inlets and the water outlets of the pipes are connected to a water supply circuit (not shown) which circulates water at high flow rate through the pipes.

The pilot plant work carried out by the applicant has established that the above-described process and apparatus is an effective and efficient technology for smelting iron ore.

Many modifications may be made to the preferred embodiment of the present invention as described above without departing from the spirit and scope of the present invention.

By way of example, whilst the preferred embodiment includes injecting iron ore, solid carbonaceous material and fluxes via each lance/tuyere 11, it can readily be appreciated that the present invention is not so limited and extends to arrangements in which only one or two of these feed materials are injected through each lance/tuyere 11.

Furthermore, whilst the preferred embodiment includes continuous discharge of metal via the forehearth 57, the present invention is not so limited and extends to batch tapping of molten metal.

What is claimed is:

1. A direct smelting process for producing metal from a metalliferous feed material which includes the steps of:

(a) forming a molten bath having a metal layer and a slag layer on the metal layer in a metallurgical vessel;

(b) injecting an oxygen deficient carrier gas, a metalliferous feed material, and a solid carbonaceous material into the molten bath via a plurality of downwardly extending solid material injection lances/tuyeres positioned so that outlet ends of the lances/tuyeres are below the surface of the molten bath and above the metal layer and causing molten material to be projected from the molten bath as splashes, droplets and streams into a space above a nominal quiescent surface of the molten bath to form a transition zone;

(c) smelting metalliferous feed material to metal in the molten bath;

(d) injecting an oxygen-containing gas into the vessel via one or more than one lance/tuyere and post-combusting reaction gases released from the molten bath, whereby the ascending and thereafter descending splashes, droplets and streams of molten material in the transition zone facilitate heat transfer to the molten bath, and whereby the transition zone minimizes heat loss from the vessel via the side walls in contact with the transition zone; and the process further includes extending the effective length of the solid material injection lances/tuyeres by forming pipes of solid material on the outlet ends of the lances/tuyeres while injecting the metalliferous feed material and the carbonaceous material and the oxygen-deficient gas through the lances/tuyeres.

2. The process defined in claim 1 wherein step (d) of forming the pipes includes injecting the metalliferous material and/or the carbonaceous material through the solid material injection lances/tuyeres so that the endothermic nature of the reactions involving these materials in the molten bath creates regions around the outlet ends of the solid material injection lances/tuyeres that are below a temperature at which slag freezes.

3. The process defined in claim 1 includes injecting the metalliferous feed material and/or the carbonaceous material in step (b) so that the pipes form as co-axial extensions of the solid material lances/tuyeres.

4. The process defined in claim 3 includes controlling the mass flow rate of the metalliferous feed material and the carbonaceous material and/or the velocity of the carrier gas, the metalliferous feed material and the carbonaceous material.

5. The process defined in claim 1 includes maintaining the outlet ends of the solid material injection lances/tuyeres at temperatures below that at which slag freezes so as to encourage initial solidification of solid material on the ends.

6. The process defined in claim 1 wherein step (b) includes injecting the metalliferous feed material and the carbonaceous material through one or more than one of the solid material injection lances/tuyeres.

7. The process defined in claim 1 wherein step (b) includes injecting the metalliferous feed material without the carbonaceous material through one or more than one of the solid material injection lances/tuyeres.

8. The process defined in claim 1 wherein step (b) includes injecting the carbonaceous material without the metalliferous feed material through one or more than one of the solid material injection lance/tuyeres.

9. The process defined in claim 1 wherein the outlet ends of the solid material injection lances/tuyeres are at least 150 mm above a quiescent surface of the metal layer.

10. The process defined in claim 1 wherein the outlet ends of the solid material injection lances/tuyeres are no more than 500 mm above a quiescent surface of the metal layer.

11. The process defined in claim 1 wherein each solid material injection lance/tuyere includes:

(a) a hollow elongate member that defines a central passageway for the feed material and has an inlet end and the outlet end, and (b) an outer water cooling jacket.

12. The process defined in claim 11 wherein the member extends beyond the water cooling jacket at the outlet end of each solid material injection lance/tuyere.

13. The process defined in claim 1 wherein each solid material injection lance/tuyere extends downwardly and inwardly into the vessel at an angle of 30 to 60° to the vertical.

* * * * *